(12) United States Patent
Nadiv

(10) Patent No.: US 11,157,678 B2
(45) Date of Patent: Oct. 26, 2021

(54) SCALABLE CONTENT RENDERING

(71) Applicant: Taboola.com Ltd, Ramat Gan (IL)

(72) Inventor: Efraim Nadiv, Tel-Aviv (IL)

(73) Assignee: TABOOLA.COM LTD, Ramat Gan (IL)

(*) Notice: Subject to any disclaimer, the term of this patent is extended or adjusted under 35 U.S.C. 154(b) by 6 days.

(21) Appl. No.: 16/403,900

(22) Filed: May 6, 2019

(65) Prior Publication Data
US 2019/0258699 A1    Aug. 22, 2019

Related U.S. Application Data

(63) Continuation of application No. 15/610,914, filed on Jun. 1, 2017, now Pat. No. 10,346,511.

(60) Provisional application No. 62/344,077, filed on Jun. 1, 2016.

(51) Int. Cl.
| | | |
|---|---|---|
| *G06F 17/00* | (2019.01) | |
| *G06F 40/106* | (2020.01) | |
| *G06F 16/957* | (2019.01) | |
| *G06F 16/338* | (2019.01) | |
| *G06F 40/117* | (2020.01) | |
| *G06F 40/166* | (2020.01) | |

(52) U.S. Cl.
CPC .......... *G06F 40/106* (2020.01); *G06F 16/338* (2019.01); *G06F 16/9577* (2019.01); *G06F 40/117* (2020.01); *G06F 40/166* (2020.01)

(58) Field of Classification Search
CPC .. G06F 17/212; G06F 40/2013; G06F 40/114; G06F 40/106; G06F 40/117; G06F 40/338; G06F 40/166; G06F 16/9577; G06F 16/338

USPC .................................. 715/243, 246, 253, 815
See application file for complete search history.

(56) References Cited

U.S. PATENT DOCUMENTS

| | | | | |
|---|---|---|---|---|
| 7,310,633 B1* | 12/2007 | Wang | .................... | G06F 16/338 707/742 |
| 7,409,635 B2* | 8/2008 | Epstein | ................ | G06F 40/114 715/243 |
| 7,496,840 B2* | 2/2009 | Hailey | ................... | G06Q 10/10 715/243 |
| 7,831,586 B2* | 11/2010 | Reitter | ................... | G06Q 30/00 707/709 |

(Continued)

OTHER PUBLICATIONS

Lopez, Using the DOM Tree for Content Extraction, EPTCS 98', 2012, Workshop on Automated Specification and Verification of Web Systems (Year: 2012).*

(Continued)

*Primary Examiner* — Stephen S Hong
*Assistant Examiner* — Matthew J Ludwig
(74) *Attorney, Agent, or Firm* — Tutunjian & Bitetto, P.C.

(57) ABSTRACT

The presently disclosed subject matter includes a computer-implemented system and method for receiving content from another computer device and dynamically adapting display of the received content within a container of a formatted document, the container defining a restricted area within the formatted document designated for displaying the content. Sub-elements within at least one content item are identified and tagged, the tagging enables to acquire display parameters of tagged sub-elements and calculate therefor a required adaptation of the content item such that it can be fitted within the respective container.

20 Claims, 9 Drawing Sheets

(56) References Cited

U.S. PATENT DOCUMENTS

| | | | | |
|---|---|---|---|---|
| 8,037,410 | B2* | 10/2011 | Ramakrishnan | G06F 40/106 715/256 |
| 9,665,556 | B1* | 5/2017 | Sutariya | G06F 40/186 |
| 10,126,903 | B2* | 11/2018 | Peng | G06F 9/451 |
| 10,621,274 | B2* | 4/2020 | Weskamp | G06F 40/114 |
| 2005/0251742 | A1* | 11/2005 | Mogilevsky | G06F 40/106 715/236 |
| 2006/0107204 | A1* | 5/2006 | Epstein | G06F 40/106 715/243 |
| 2010/0097633 | A1* | 4/2010 | Gaucas | G06F 3/1257 358/1.15 |
| 2010/0107061 | A1* | 4/2010 | Ramakrishnan | G06F 40/103 715/256 |
| 2011/0225540 | A1* | 9/2011 | d'Entremont | G06F 9/451 715/786 |
| 2012/0284607 | A1* | 11/2012 | Jones | G06F 40/106 715/234 |
| 2013/0097482 | A1* | 4/2013 | Marantz | G06F 16/9577 715/234 |
| 2015/0205884 | A1* | 7/2015 | Leventhal | G06F 16/80 715/234 |
| 2019/0163762 | A1* | 5/2019 | Mirea | G06F 16/958 |

OTHER PUBLICATIONS

Anonymously, 'System and method for auto-adaptive HTML element adjustment when truncation occurs', IP.com, publication date 2013 (Year: 2013).*

\* cited by examiner

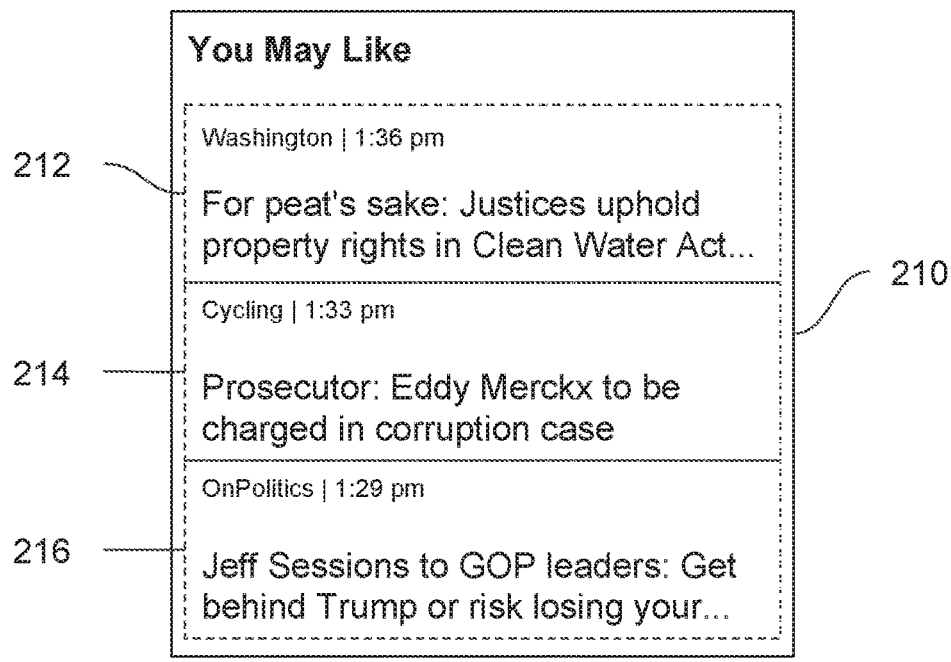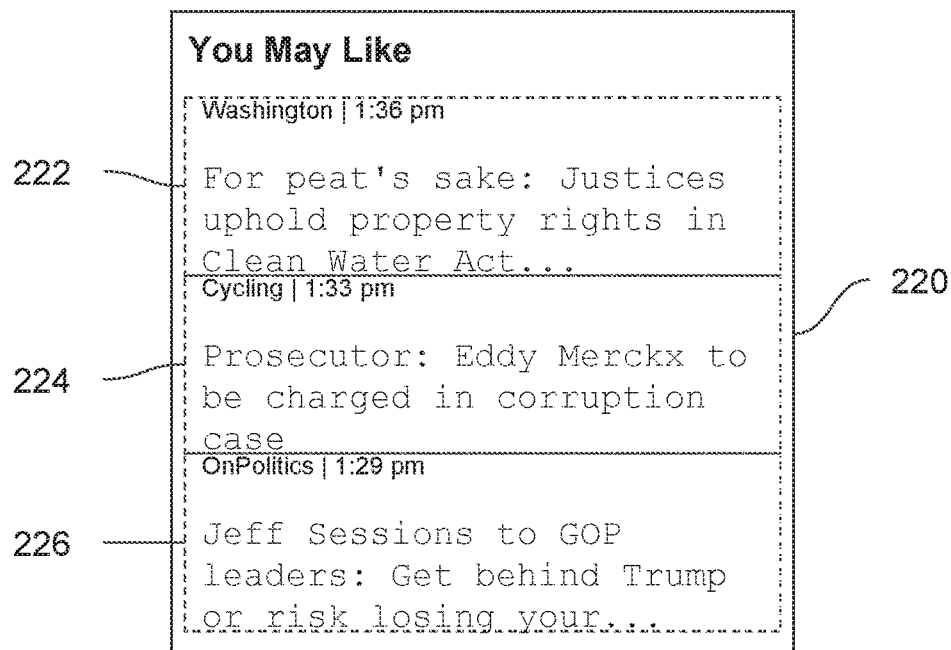
Fig. 2

How to protect your computer against all cyber threats: The full guide you must read — 310

How to protect your computer against all cyber threats: The — 320

How to protect your computer against all cyber threats: The... — 330

An example long text string that is allocated only 3 visual lines. Maybe I can have a title this long. — 340

An example long text string that is allocated only 3 visual lines. Maybe I can have a tit... — 350

An example long text string that would fit several visual lines and even overflow its allocated container

— 710

\<ins>An\</ins>\<ins>example\</ins>\<ins>long\</ins>\<ins>text\</ins>\<ins>string\</ins>\<ins>that\</ins>\<ins>would\</ins>\<ins>fit\</ins>\<ins>several\</ins>\<ins>visual\</ins>\<ins>lines\</ins>\<ins>and\</ins>\<ins>even\</ins>\<ins>overflow\</ins>\<ins>its\</ins>\<ins>allocated\</ins>\<ins>container\</ins>

Fig. 7a

`<ins>`An`</ins><ins>`example`</ins><ins>`long`</ins><ins>`text`</ins><ins>`string`</ins><ins>`that`</ins>`<span>...</span>`<ins>`overflow`</ins><ins>`its`</ins><ins>`allocated`</ins><ins>`container`</ins>`

SCALABLE CONTENT RENDERING

This application is a Continuation of co-pending U.S. patent application Ser. No. 15/610,914 filed on Jun. 1, 2017, which claims priority from provisional application No. 62/344,077 filed on 1 Jun. 2016 which is incorporated herein by reference in its entirety.

FIELD OF THE PRESENTLY DISCLOSED SUBJECT MATTER

The presently disclosed subject matter relates to the field of formatting and displaying digital content.

BACKGROUND

Digital content is usually sent from a content source or server, to be consumed in a client or another machine or location. A browser (e.g. web browser) is a software application that consists of numerous software components, which process digital content of various types (normally including information resources identified by uniform resource identifier or locator), together with a set of internal (i.e. defined locally by the browser) and external (i.e. defined by entities other than the browser such as the content source, the operating system, the host device, etc.) directives and constraints, and eventually decides how exactly the content should be laid out and eventually displayed on a display device of a certain host computer, under those specific circumstances. Examples of browsers include Google Chrome, Internet Explorer, Opera, Safari, and others.

FIG. 1 is a schematic illustration of an example of a webpage layout. Webpage 100 displays multiple visual containers, some of these containers assigned with a certain restricted area for displaying respective content items. Containers 110 and 120 display a menu and navigation bar, container 130 displays the title, and container 140 displays contents of an article. In addition, the webpage example shows four different recommendation widgets 150, 160, 170 and 180, each comprising in turn a number of inner visual containers (including e.g. 151, 152, 153, 161, etc.) for displaying recommendations for webpage viewers. A recommendation can include a suggested clickable alternative information resource.

GENERAL DESCRIPTION

A browser handles an abundance of input parameters, including code, instructions, directives, constraints, and content of various types, in a dynamic real-time environment. For example, in the case of text rendering, such browser input parameters include, inter alia: type of host device, size of display screen, size of display window, size of content (e.g. word count), available fonts, word-spacing, letter-spacing, word-breaking, hyphenation, other font metrics, specific JavaScript and cascade styling sheet (CSS) instructions received from a content source, etc.

Due to the abundance of these parameters as well as the dynamic real-time environment (resulting, inter alia, from the fact that many of these parameters are only taken into account by the browser in real-time during the rendering process), in a lot of cases it is practically impossible to predict in advance the precise manner in which the content would be eventually rendered and displayed on display device of a specific host computer.

Some variations in displayed content result from differences in the operating system which is being used (e.g. the same "Helvetica" font may have a different implementation in a Windows operating system vs. in a Macintosh operating system), other variations from differences in the installed software packages and yet others from differences in hardware configuration (e.g. in the same type of device), or from other real-time conditions (e.g. whether or not a certain font is available for retrieval from a third-party server during the rending process), may result.

Consequently, the exact size of a container assigned for displaying certain text and/or the specific area which is required for displaying the text may not be known until the webpage has been rendered. For example, if some style directive of a webpage, which is being rendered at a host computer, assumes a specific font should be used for a specific textual content, but that specific font is not available for some reason on the browser software at that time, then the browser may select, in real-time, a different font from the ones which are available, and use it to display the textual content. As further demonstrated with reference to FIG. 2 below, selection of font type in real-time can affect the way the text is rendered on the display, and in particular can affect the size of the specific area which is required to display that certain text.

Ultimately, such real-time decisions may affect various visual aspects of the overall rendered page. For example, selection of alternative fonts by the browser, with metrics larger than the metrics of the originally intended fonts, may result in an increase in the area required for displaying a certain textual content, leading to an "overflow" of the text outside its designated container, or alternatively "pushing" other content to be displayed further below than originally intended. On the other hand, selection of alternative fonts with metrics smaller than metrics of the originally intended fonts may result in leaving a large empty space within the designated container, unlike the originally intended result, and further degrading the appearance of the page and the overall user experience.

One example of this problem is related to the rendering of multiple lines of text within a restricted designated container, referred to herein below as the "multiline clamping problem". As mentioned above with respect to FIG. 1, text in a webpage is many times displayed within a restricted area of a container designated for that purpose. Each such container (e.g. in a respective recommendation widget) has a predefined display area that has been allocated for it, and the relevant text can only be displayed within this area.

Therefore, at least from the point of view of the overall user experience, it is often required or expected that during rendering of a webpage, where "multiline clamping problems" occur, text designated to be displayed in a certain container may be truncated, or "clamped", by the browser of the host computer so it fits the area of the respective container. In some cases, when such clamping occurs, the browser further adds a visual indication (e.g. an ellipsis character " . . . ") to indicate to a webpage viewer that the text has been truncated.

According to some existing approaches for handling the "multiline clamping problem", the text is truncated at the server before it is sent to the browser to be rendered in a specific manner, with the intention that after this truncation the text would be rendered by the browser in a way that is intelligible, aesthetic and appealing to eye. However, due to the dynamic real-time environment in which the browser operates, many times a text truncated by the server is eventually rendered by the browser in a way that is aesthetically degraded, unappealing and sometimes unintelligible (e.g. due to text overflow from the designated container).

FIG. 2 is a schematic illustration of an example of two different layouts of the same recommendations widget, which demonstrates how this approach may fail. It is noted that the example shown in FIG. 2 is non-limiting and recommendations can include various combinations of components including one or more of: images, videos, text, etc. FIG. 2 shows widget 210 and widget 220, each comprising three containers for textual content. Widget 210 shows the texts rendered as originally intended by the server (see 212, 214, 216), and widget 220 shows the same texts as they were actually rendered and displayed (see 222, 224, 226) by a browser at a host computer under the constraints resulting from the specific dynamic real-time environment of the browser.

For example, a specific font family and font size may be selected at the server side with the intention that the text would fit into exactly two visual lines within the container. However, since the selected font is not available at the browser in real-time (e.g. the font was not installed or otherwise unavailable at time of webpage rendering) the browser selects, in real-time, an alternative font, resulting in the text rendered as shown in widget 220.

Notice for example, containers 214 and 224, where the same text that originally intended to fit into two visual lines now spans more than two visual lines. The text in in 224 ends after one word in the third visual line, leaving the rest of line empty, which is different than the originally intended visual outcome.

Notice further containers 212 and 222. In container 212 the ellipsis character (" . . . ") at the end of the second visual line indicates to the reader that the original sentence was longer, but was truncated after the word "Act . . . ", because there is evidently no room to display the rest of the words in the original sentence. Indeed, this truncation was done in advance by the server, expecting the visual result shown in container 212. In container 222, the same truncated text that was provided by the server spans across three visual lines, and the ellipsis character " . . . " appears in the middle of the third visual line after the word "Act". This results in a degraded user experience as it is not clear to the user why no more words of the sentence appear where there is evidently more room to show them.

According to other existing approaches, the rendering of the original text is performed by the browser at the host computer, which determines in real-time if and how the text should be rendered and possibly truncated. FIG. 3 is a schematic illustration demonstrating such approaches.

Container 310 includes certain text rendered according to some textual styling requirements that include rendering the text over three visible lines within the container. Container 320 includes the text which was actually rendered by the browser under the constraints imposed by the browser's real-time dynamic environment. Note that unlike the styling shown in container 310, here the text is bounded by the area of the container and thus only the part of the text which fits within the first two lines of the container is visible. Namely, part of the text including the words "full guide you must read" is omitted, and the text abruptly terminates with the word "The", with no visual indication that the displayed text is a truncated version of a longer text, and thus may degrade user experience. In contrast, a more desired user experience can be achieved by adding a visual indication (e.g. ellipsis) to indicate that the original text was truncated, as illustrated in container 330.

Another problem that can arise from the real-time decisions made by the browser during execution of the rendering process is demonstrated in container 350. The original text that required four visual lines (as shown in container 340) has been constrained, due to the size of the container, to only three visible lines. The truncation of text in container 350 inadvertently resulted in text truncated in the middle of the word "title" (leading to potentially offensive language).

Some of the existing approaches, which intend to handle the "multiline clamping problem" provide a solution which is limited only to specific cases e.g. applicable only in a certain type of browser, applicable only in a specific configuration, or assume that the background of the text is always of some specific color, etc.

Some of the existing approaches, which enable to better control how a content is rendered by the browser and truncate the text to fit more accurately within a designated container, consume valuable computer resources (e.g. processing resources, time and memory resources), a consumption which degrades both computer performance and user experience, sometimes to the extent that such approaches are no longer acceptable as a valid solution to the problem by the industry, e.g. the required time resources are unacceptable.

According to one such approach, text overflowing from its container is repeatedly truncated (e.g. by a single letter or by a whole word) until it is determined that the truncated text fits its respective container. To this end, the browser is repeatedly queried (e.g. after each truncation) to provide measurements of certain visual aspects of the rendered texts and their respective containers. These visual measurements can be used for determining the location of a text relative to its designated container and eventually deduce therefrom whether the text is properly fitted within the boundaries of the container.

However, changes made to the content of a webpage (such as truncation of text) are likely to invoke a "reflow" (the process of re-rendering and repainting the webpage to the changes made) computation by the browser in response to subsequent queries for visual measurements. Approaches such as the above (repeatedly modifying text and querying for visual measurements) may lead to a large number of "reflow" computations.

Reflow is a costly process (in terms of computer resources consumption), sometimes effectively involving heavy calculations and the repainting of the entire webpage. Repeatedly executing a reflow process after each truncation can tremendously degrade both computer performance and user experience (e.g. resulting in a significant delay in the webpage loading time). In addition, it may be required to repeat this process for each of the "multiline clamping problem" instances in the webpage, e.g. for each of the containers in each of the widgets in a webpage, until all the texts are fitted within their respective containers. This repetitive process increases even further computer resources consumption as well as the total rendering time of the webpage.

The presently disclosed subject matter includes a computer system and a computer implemented method that allow to better understand the relation between content and the manner in which it is rendered, thereby increasing control over the manner in which content is being rendered at a host device (e.g. by a browser) in a performant, responsive and scalable manner, notwithstanding the dynamic real-time environment of the browser.

According to one aspect of the presently disclosed subject matter there is provided a computer-implemented method for dynamically adapting display of content within a container of a formatted document, the container defining a restricted area within the formatted document designated for displaying the content, the method comprising:

using one or more computer processors for executing a content rendering process (e.g. by a browser), comprising:

identifying sub-elements within at least one content item, the at least one content item is assigned to be displayed within a respective container in a formatted document; tagging at least some of the sub-elements to thereby obtain a plurality of tagged sub-elements of the at least one content item; wherein the tagging enables to obtain display parameters of tagged sub-elements (e.g. from the browser); displaying at least some of the tagged sub-elements of the content item in the respective container in the formatted document; determining display parameters of at least some of the tagged sub-elements; calculating, based on at least the display parameters, whether at least one sub-element overflows from an area designated for displaying content in the respective container; in case at least one sub-element overflows the respective container: adapting the at least one content item to fit in the area; and displaying the adapted at least one content item within the area of the container in the formatted document.

Additional to the above features, the method according to this aspect of the presently disclosed subject matter can optionally comprise one or more of features (i) to (xi) below, mutatis mutandis, in any technically possible combination or permutation.

i) wherein, in case at least one sub-element overflows the respective container, an increase in the number of overflowing sub-elements does not require an increase in the number of displaying operations.

ii) wherein the at least one content item includes textual content and the tagged sub-elements include tagged textual sub-elements.

iii) wherein the calculating whether at least one sub-element overflows the respective container comprises: determining, based on the display parameters, position of at least one tagged sub-element with respect to the area designated for displaying content in the respective container; and determining whether the position is indicative of an overflow of the at least one sub-element outside the boundaries of the area.

iv) wherein the calculating whether at least one sub-element overflows the respective container comprises one or more of (1) and (2):

1)
(a) determining the height and width of the tagged textual sub-element;
(b) determining the height and width of the respective container;
(c) determining based on (a) and (b) whether at least one sub-element overflows the respective container;

2)
(a) determining the offset of at least one tagged textual sub-element relative to the respective container;
(b) determining the height of the respective container;
(c) determining based on (a) and (b) whether at least one sub-element overflows the respective container.

v) wherein the adapting the at least one content item to fit in the respective container, comprises identifying a last visible line of the at least one content item; and modifying the last visible line in the container to include a new textual element; the new textual element is configured to be displayed in a single line, such that it is truncated in case of a text overflow.

vi) wherein the adapting the at least one content item to fit in the respective container, comprises, removing a plurality of tagged textual sub-elements such that the remaining textual sub-elements fit within the area; and adding a visual indication that the plurality of tagged textual sub-elements were removed.

vii) wherein the adapting further comprises adding one or more characters designated for indicating to a viewer of the document that sub-elements have been truncated.

viii) wherein the at least one content item includes a plurality of content items each assigned to be displayed in a plurality of respective containers in the formatted document and wherein, in case at least one content item overflowed the respective container, an increase in the number of content items does not require an increase in the number of displaying operations.

ix) wherein the tagging at least part of the sub-elements comprises: wrapping each one of sub-elements with an HTML tag to thereby transform the sub-element into a Document Object Model element.

x) The method further comprises, in response to a change in one or more display environment characteristics, automatically repeating the content rendering process to thereby adapt the content item to fit within the respective container.

xi) The method further comprising: monitoring display environment characteristics, including at least size of window assigned for displaying the formatted document, dimensions of window assigned for displaying the formatted document, size of the respective container, and dimensions of the container.

According to another aspect of the presently disclosed subject matter there is provided a computer-implemented system comprising: at least one computer device configured for receiving content from another computer device and dynamically adapting display of the received content within a container of a formatted document, the container defining a restricted area within the formatted document designated for displaying the content, the computer device comprising a processing circuitry configured to:

identifying sub-elements within at least one content item, the at least one content item is assigned to be displayed within a respective container in a formatted document; tagging at least part of the sub-elements to thereby obtain a plurality of tagged sub-elements of the at least one content item; wherein the tagging enables to obtain display parameters of tagged sub-elements; displaying at least part of the tagged sub-elements of the content item in the respective container in the formatted document; determining display parameters of at least part of the tagged sub-elements; calculating, based on at least the display parameters, whether at least one sub-element overflows from an area designated for displaying content in the respective container; in case at least one sub-element overflows the respective container: adapting the at least one content item to fit in the area; and displaying the adapted at least one content item within the area of the container in the formatted document.

According to another aspect of the presently disclosed subject matter there is provided a non-transitory program storage device readable by a computer, tangibly embodying computer readable instructions executable by the computer to perform a computer-implemented method of for dynamically adapting display of content within a container of a formatted document, the container defining a restricted area within the formatted document designated for displaying the content, the method comprising:

obtaining data indicative of sub-elements within at least one content item, the at least one content item is assigned to be displayed within a respective container in a formatted document, the sub-elements comprising a plurality of tagged sub-elements; wherein tagging of sub-elements enables to obtain display parameters of tagged sub-elements;

displaying at least part of the tagged sub-elements of the content item in the respective container in the formatted document; determining display parameters of at least part of the tagged sub-elements; calculating, based on at least the display parameters, whether at least one sub-element overflows from an area designated for displaying content in the respective container; in case at least one sub-element overflows the respective container: adapting the at least one content item to fit in the area; and displaying the adapted at least one content item within the area of the container in the formatted document.

The presently disclosed subject matter further contemplates a user device configured for executing the operations of the method disclosed above.

The system, the computer storage device and the user device disclosed in accordance with the presently disclosed subject matter can optionally comprise one or more of features (i) to (xi) listed above, mutatis mutandis, in any technically possible combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 2 is a schematic illustration of an example of two manners in which a recommendation widget may be rendered;

FIG. 3 is a schematic illustration of different examples demonstrating results of real-time rendering by the browser.

FIGS. 7a, 7b and 7c are schematic illustrations demonstrating some principles of the method described with reference to FIG. 6, in accordance with some examples of the presently disclosed subject matter.

DETAILED DESCRIPTION

Figure 1:
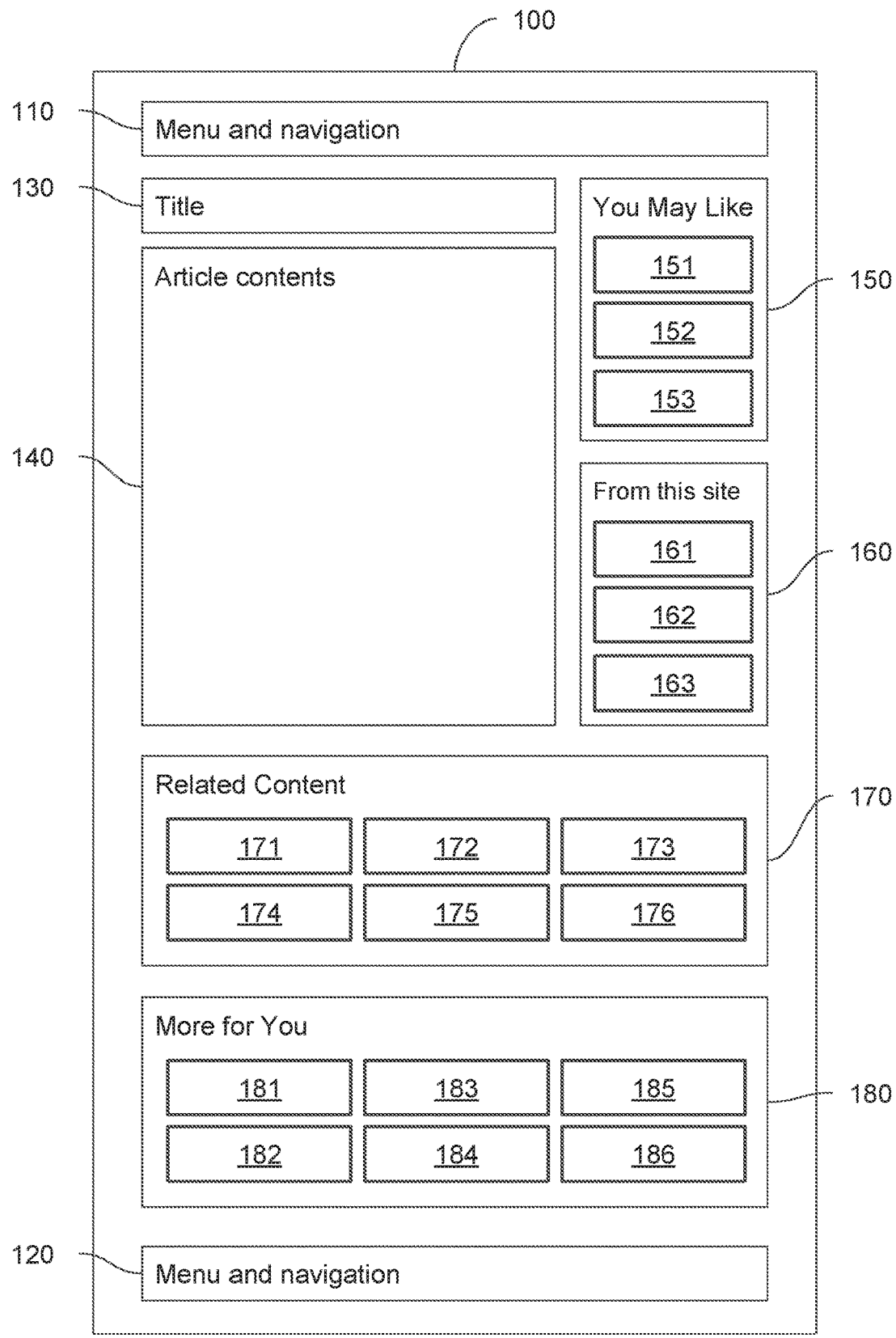
FIG. 1 is a schematic illustration of a webpage example.

Elements in the drawings are not necessarily drawn to scale. Unless specifically stated otherwise, as apparent from the following discussions, it is appreciated that throughout the specification discussions utilizing terms such as "identifying", "tagging", "displaying", "calculating", "adapting", "executing" or the like, include actions and/or processes of a computer that manipulate and/or transform data into other data, said data represented as physical quantities, e.g. such as electronic quantities, and/or said data representing the physical objects.

The terms "computer", "computer device", "computerized device", "computer system", or variation thereof should be expansively construed to include any kind of electronic device with a processing circuitry capable of data processing and which includes one or more computer processors operatively connected to a computer memory (optionally including non-transitory computer memory) operating together for executing and/or generating instructions. Examples of such a device include: digital signal processor (DSP), a microcontroller, a field programmable gate array (FPGA), an application specific integrated circuit (ASIC), a personal computer, server computer device, other dedicated processing device, etc.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

Figure 6:
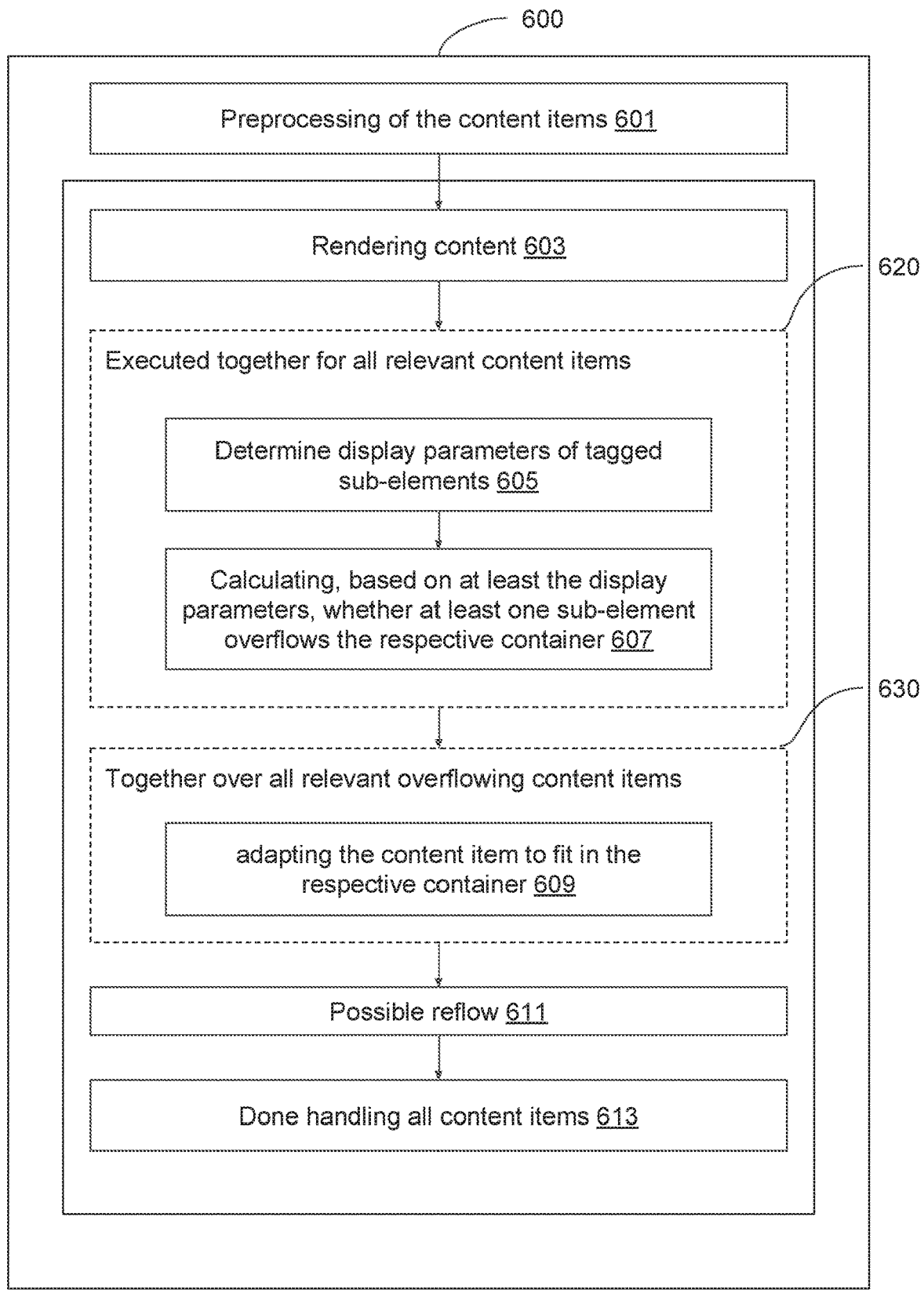
FIG. 6 is a flowchart showing operations carried out in accordance with some examples of the presently disclosed subject matter.

In embodiments of the presently disclosed subject matter, fewer, more and/or different stages than those shown in FIG. 6 may be executed. Also the order of execution of the described operations should not be limited to the order which is presented in the figures.

Figure 4:
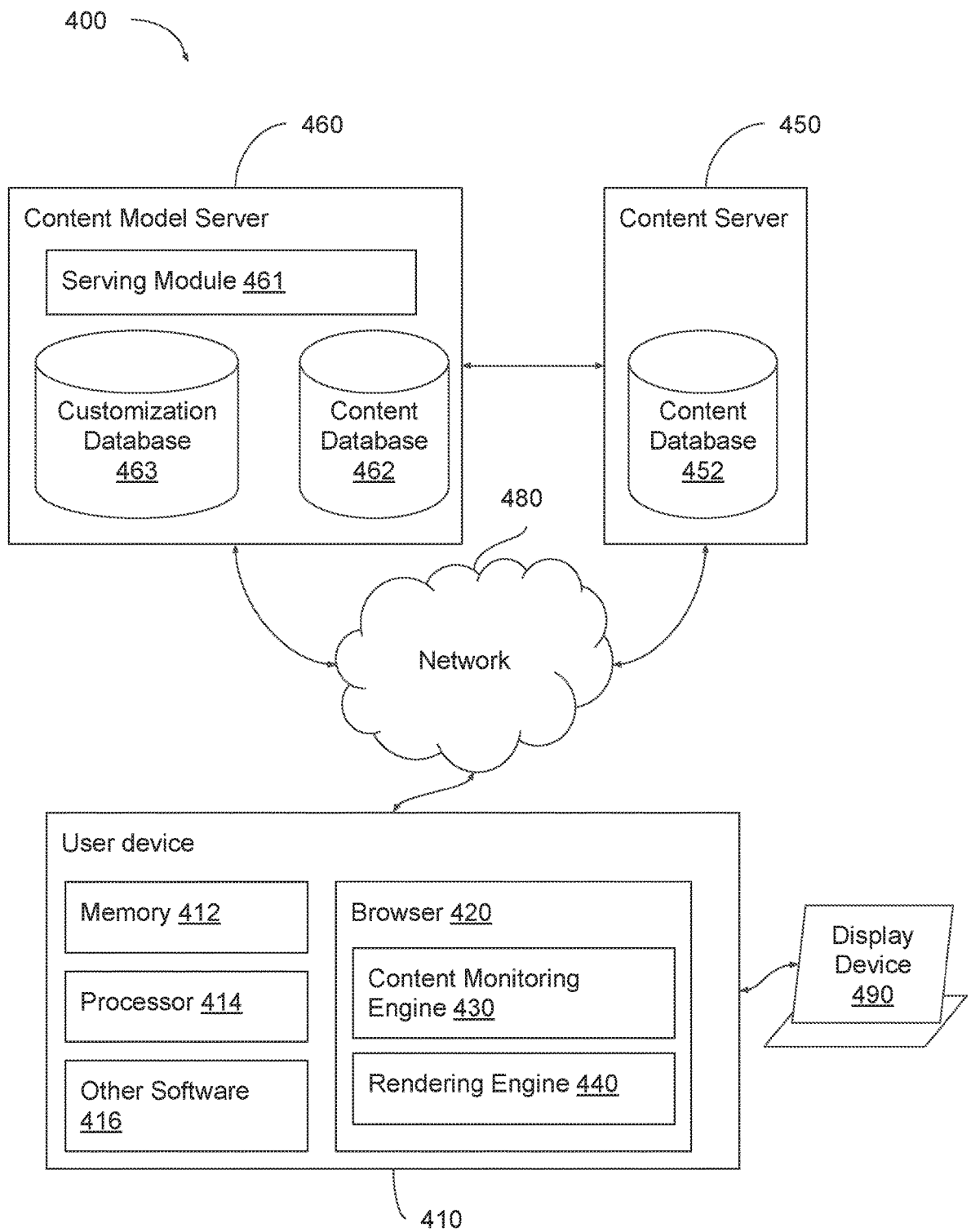
FIG. 4 is a schematic illustration of a block diagram of a general view of a computer system, in accordance with some examples of the presently disclosed subject matter.
Figure 5:
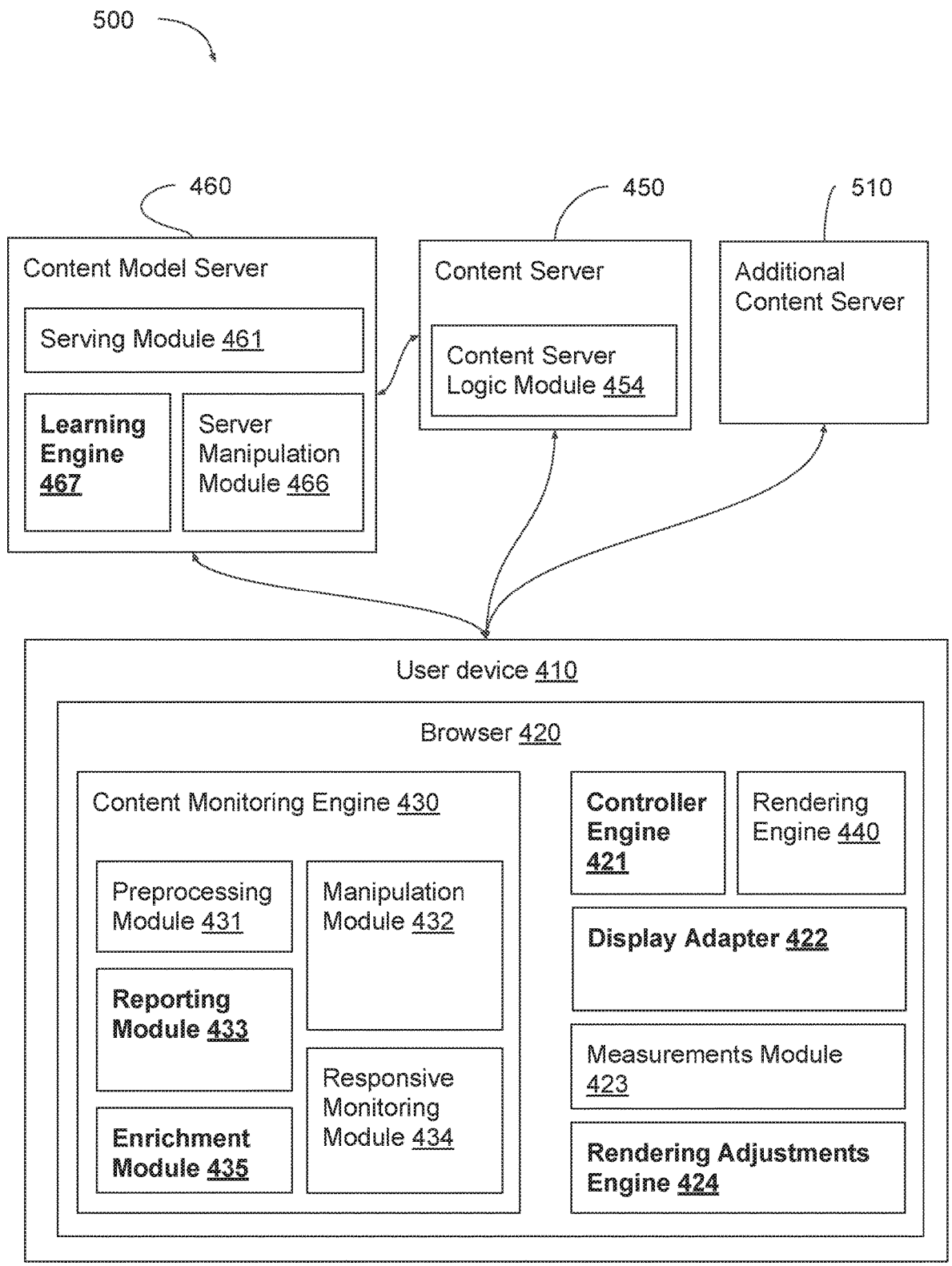
FIG. 5 is a schematic illustration of a more detailed view of some components of FIG. 4, in accordance with some examples of the presently disclosed subject matter.

FIGS. 4 and 5 illustrate general schematic diagrams of the system functional in accordance with an embodiment of the presently disclosed subject matter. The components in FIGS. 4 and 5 may be centralized in one location or dispersed over more than one location. In other embodiments of the presently disclosed subject matter, the system may comprise fewer, more, and/or different modules than those shown in FIGS. 4 and 5. For example, while server computer 450 is illustrated as a single computer device, in other examples it may be implemented as several interconnected computer devices distributed at different locations (e.g. some onboard the aircraft and some located elsewhere).

The term "performant" as used herein should be broadly construed to include the efficient usage of computers' resources (including CPU, memory, disk resources etc.), as well as time resources. For example, a website owner may not use a third-party JavaScript code if it imposes a performance overhead, such as causing the web page to be displayed after more than a certain time (e.g. 500 milliseconds), or consuming too much memory, or too high CPU resources.

The term "responsive" or "responsiveness" as used herein, should be broadly construed to include applicability to different display environments as well as to changes (in real-time) in display environment. The term "display environment" is used to include various parameters which characterize the display of content in a computer device including, but not limited to: size or dimensions of display screen, size or dimensions of display windows or containers, display screen resolution, etc.

The term "scalable" or "scalability" as used herein, should be broadly construed to the capability to handle a growing amount of work, or the potential to accommodate that growth.

Bearing the above in mind, attention is now drawn to FIG. 4 which shows a schematic illustration of a block diagram of a general view of a computer system according to some examples of the presently disclosed subject matter. System 400 shown in FIG. 4 is a general example which demonstrates some principles of the presently disclosed subject matter and should not be construed as limiting in any way.

System 400 comprises a number of computer devices connected over a communication network. In the illustrated example, system 400 comprises user device 410, Content Server 450 and Content Model Server 460. Communication between different computer devices in system 400 can be facilitated over one or more types of communication networks 480. For example communication networks can include any one of: the Internet, local area network (LAN), wide area network (WAN), metropolitan area network (MAN), various types of telephone networks (including for example PSTN with DSL technology) or mobile networks (including for example GSM, GPRS, CDMA etc.), or any combination thereof. Communication within the network can be realized through any suitable connection (including wired or wireless) and communication technology or standard (WiFi, 3G, LTE, etc). The various computer devices in system 400 are operable to communicate over the network communication links.

User device 410 represents a viewing entity consuming content provided by Content Server 450. User device 410 can be any computer device (e.g. PC, laptop, Smartphone, notepad, etc.) comprising, inter alia, a processing circuitry (e.g. including one or more computer processors 414 operatively connected to a computer memory 412), a communication infrastructure for facilitating communication with other computer devices, and display device 490 (e.g. LED display device, e.g. via display adapter 422). User device 410 further comprises various computer programs 416 executable by the processing circuitry. Computer programs include, but are not limited to, one or more operating systems and a client agent configured to manage communication between user device 410 and another computer device inter-connected by communication network 480. According to some examples, client agent can be implemented as web browser 420.

According to some examples of the presently disclosed subject matter, web browser 420 further comprises Content Monitoring Engine 430, which is received (or updated) at the user device 410 in real-time and includes data and computer instructions to be executed by the browser.

Content Server 450 represents one or more server computer devices configured to provide content to other computer devices (such as user device 410). In some cases, content is provided to a computer device by Content Server 450 in response to a request issued by the computer device. Such requests can possibly include one or more of: details on the user (e.g. cookies, IP address, user credentials), the device (user agent information, browser configuration, fonts installed, default language, etc.) and context (URL, request parameters, e.g. keywords, etc.).

Content Server 450 is operatively connected to one or more data storage units implementing a content database 452 for storing the relevant content. The stored content can include any type of Internet content available today such as web objects (text, graphics and scripts), downloadable objects (media files, software, documents), applications (e-commerce, portals), etc. The content provided by Content Server 450 is presented on a display device of the receiving computer device, in a formatted document such as a web page document, the formats including for example: news website format, email message format, newsletter format, etc. One example of Content Server 450 is a web server configured to process and respond to HTTP requests. Other examples of Content Server 120 include mail servers, video streaming servers, etc. Herein below the term web page is used by way of non-limiting example, however the presently disclosed subject matter contemplates other types of formatted documents and therefore the term "web page" should not be construed as limiting.

Content Model Server 460 represents one or more server computer devices configured to provide content to other computer devices. In some examples, the data received from Content Server 450 at a user device 410 includes instructions to the user device (e.g. via web browser 420) to access Content Model Server 460, and obtain therefrom additional content. In other examples, Content Server 450 requests additional content from Content Model Server 460 and provides a response to user device 410, which includes the content received from Content Model Server 460.

Additional content can include for example, content which is displayed at the user device 410 in addition to the content provided by Content Server 450. Additional content can include for example, recommendations, advertisements or other content and in some cases may be related to requested content, or to some other characteristics of the viewer, user device or context.

When preparing the response (received from either a user device or content server) Content Model Server 460 can optionally use information from internal or external databases (462 and 463) storing data characterizing one or more of: the user, the user device and the requested content, and generate a response which is customized or personalized based on this information. In some implementations Content Model Server 460 sends the response to Content Server 450, which in turn sends content, optionally together with code and/or configuration, to user device 410. In other implementations Content Model Server 460 sends the response directly to user device 410.

Browser 420 at user device 410 receives the content originating from Content Server 450 and the additional content originating from Content Model Server 460. The data received at the user device 410 includes, in addition to the content, also auxiliary data such as webpage formatting instructions (e.g. CSS, fonts, etc.) and various JavaScript codes for execution by the browser. Rendering Engine 440 processes the content and formatting information and renders the content according to the formatting instructions e.g. in a webpage format. Once rendered, user device 410 displays the rendered content on the display device 490. As mentioned above, a schematic illustration of a webpage layout is shown with reference to FIG. 1.

Notably, any one of the computer devices described above can be distributed over more than one device. For example, Content Model Server 460 can be distributed over a number of server devices all owned by the same entity and/or different devices can be owned by different entities, each providing different alternative content. Furthermore, while in the example above Content Server 450 and Content Model Server 460 are described as separate entities, in some cases both types of content can be provided by the same entity.

FIG. 5 is schematic illustration of a more detailed view of some of the components shown in FIG. 4, in accordance with some examples of the presently disclosed subject matter. The functionality of some components is described below with reference to operations described in FIG. 6.

FIG. 6 is a flowchart of operations carried out during a content rendering process, in accordance with some examples of the presently disclosed subject matter. Operations described with reference to FIG. 6 (as well as 8 below) can be executed for example by system 400 described above with reference to FIG. 4 and FIG. 5. However, it is noted that the specific configuration of elements in system 400 (and specifically those depicted with respect to user device 410) is merely a non-limiting example and various modifications and alternatives to the system can be applied for executing the described operations.

As mentioned above, data is transmitted to user device 410 by Content Server 450 and possibly also by Content Model Server 460. According to some examples, the received data includes the primary content (e.g. content of a requested webpage) and additional content (e.g. advertisements and/or recommendations of alternative content) as well as auxiliary data as disclosed above.

According to the presently disclosed subject matter, Content Monitoring Engine 430 is also provided to the user device (e.g. by Serving Module 461 in Content Model Server 460). Content Monitoring Engine 430 includes additional processing instructions (e.g. in the form of JavaScript code) which are executed (e.g. by the browser) in real-time, as part of the web page rendering process and enables to increase control over the manner in which content is being rendered at the user device 410, in a performant, responsive and scalable manner. In some cases where Content Monitoring Engine 430 has already been previously received at the user device, updated instructions may be received from Content Model Server 460.

The content received at the user device is processed by the browser, which determines how to render the content on the display device. Assuming the received content (including either one of the primary content and additional content) contains one or more textual content items, according to some examples of the presently disclosed subject matter, a preprocessing stage is executed on the textual content items (block 601). According to one example, preprocessing is executed at the user device, e.g. by preprocessing module 431 in Content Monitoring Engine. According to other examples, part or all of the preprocessing can be executed at a different computer device e.g. the Content Server 450 or Content Model Server 460, prior to sending it to the user device. The phrase "textual content item" is used here to refer to textual content assigned to be displayed in a certain container (e.g. in a recommendation widget) in a webpage layout.

During the preprocessing stage (block 601) at least one textual content item is processed to identify individual sub-elements (e.g. textual sub-elements such as words and/or characters) in the textual content item. To this end Content Monitoring Engine 430 can be configured to parse the textual content item, and tokenize the text into individual sub-elements.

Further, as part of the preprocessing, the individual sub-elements are tagged to obtain a plurality of tagged sub-elements of the textual content item; wherein the tagging of sub-elements enables to query the browser in order to obtain display parameters characterizing a specific tagged sub-element. For example, assuming a tagged sub-element is a single word, the browser can be queried (e.g. the browser's Measurements Module 423, by Content Monitoring Engine 430) to provide information (display parameters) pertaining to the height of the word, width of the word and position of the word relative to its assigned container. In another example, measurements may be obtained indirectly from a Controller Engine 421, which may have direct or indirect access to obtaining such measurements from Measurements Module 423. For example, as mentioned above, in some embodiments Rendering Engine 440, Controller Engine 421, Display Adapter 422, Measurements Module 423 may be centralized in one logical location or dispersed over more than one logical location or even different computer devices. In a distributed embodiment, a Controller Engine 421 may be used to consolidate communication between different components, and Measurements Module 423 may have indirect access to the rendered output generated by Rendering Engine 440.

The obtained measurements, including display parameters characterizing tagged sub-elements, may contain valuable information related to the relation between the original content (e.g. textual content item) and the exact manner in which the content is eventually displayed at the user device. In some examples, the user device (e.g. reporting Module 433) may consolidate such obtained measurements and send some or all of them, possibly after some processing or summarizing, to Content Model Server 460. These measurements may be sent as newly generated events from user device 410, or optionally appended to existing user generated events (e.g. mouse click, key stroke, mouse hover, etc.), thereby "enriching" them with data related to the relation between the content and the manner it was displayed. For example, a user event indicating a user has clicked a recommendation including textual description may be enriched to include information on the manner the textual description was eventually displayed on the user device, e.g. the area the textual description consumed, whether there was a text "overflow" etc. This information can be further used for improving user experience, e.g. selecting a more desirable display of content based on click through rate metrics.

In some examples, such reported measurements may be consolidated at databases 462 and 463. In some examples, reported measurements may be utilized by Learning Engine 467 to better predict how to customize content at the server-side to be displayed in an intended manner. Customization Database 463 and Content Database 462 may be adapted in time to include data from Learning Engine 467.

In addition, specific and detailed characteristics of the browser may be determined based on measurements obtained from the browser. These characteristics may be sent by Reporting Module 433 to Content Model Server 460, to be stored in databases 462 and 463 in a similar way to the manner described above.

According to one specific example, during preprocessing sub-elements in the textual content item are transformed into a distinctive Document Object Model (DOM) elements. DOM elements are building blocks of the webpage, and can be manipulated programmatically by the browser. Visible changes occurring as a result of this manipulation may then be reflected when the textual content item is displayed. As explained above, by transforming the sub-elements (e.g. words and/or characters) in the text into DOM elements, it becomes possible to obtain from the browser various display characteristics of the sub-elements. Transformation of the text into DOM elements includes wrapping each word (or possibly each character) by some HTML Tag.

Figure 7B:
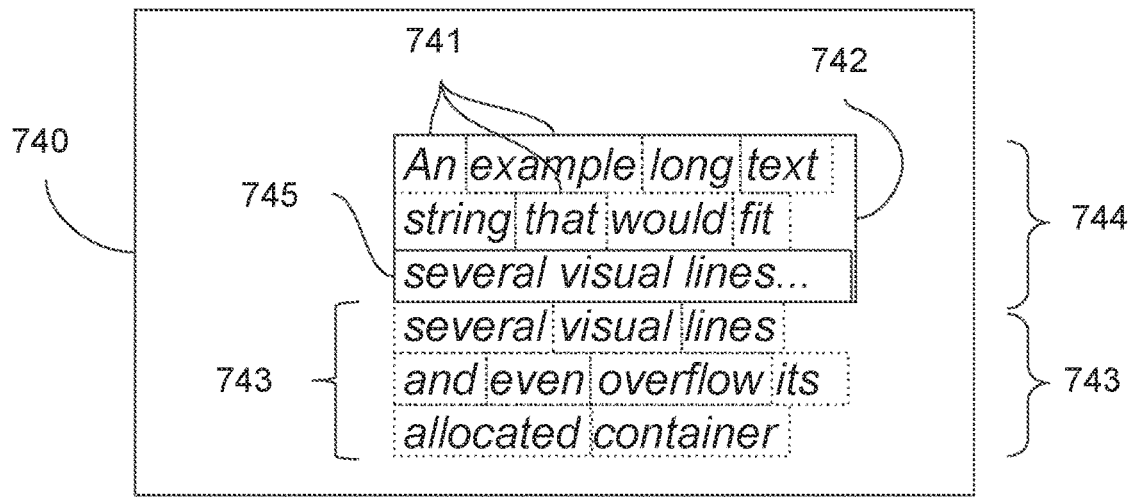
Figure 7C:
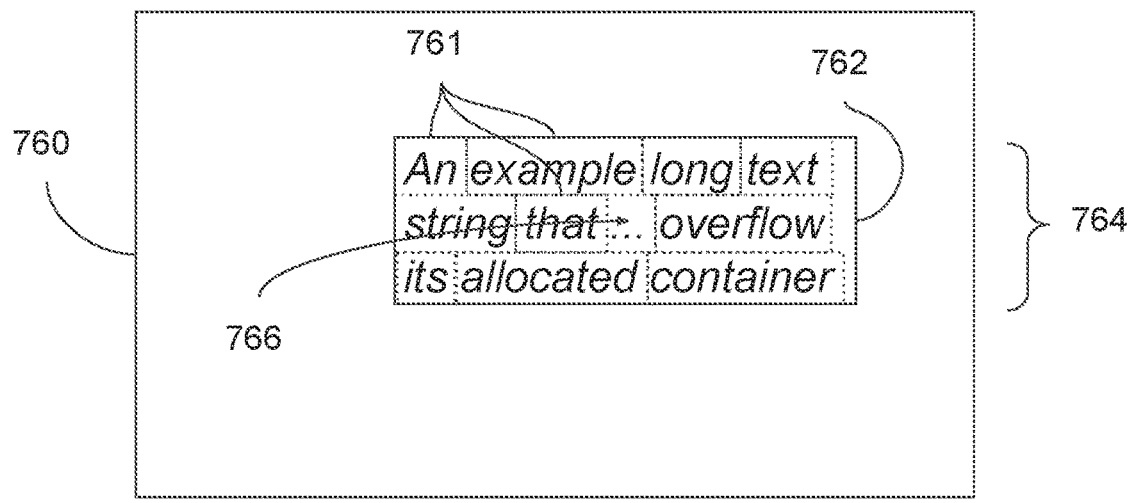

FIGS. 7a, 7b and 7c show schematic illustrations which demonstrate the operations of Content Monitoring Engine 430 on a received textual content item, in accordance with some examples of the presently disclosed subject matter.

Text 701 is the original text of textual content item received or otherwise generated at user device 410 and intended to be displayed in a web page layout. Text 710 shows the modified text after it has been tokenized into individual sub-elements (in this case individual words) and tagged with HTML tags to thereby transform the words into DOM elements. Note that the modified text 710, which originally included plain text, now includes <ins> and </ins> HTML tags that wrap each word in the text. It should be understood that any usage of <ins> HTML tag, or any other HTML tag disclosed herein is merely for the sake of illustration and is done so in a non-limiting manner. In particular, other HTML tags may be used, or alternatively any other tagging technique which enables obtaining visual measurements for the tagged sub-elements from a browser.

Reverting to FIG. 6, at block 603 the browser (e.g. by the native rendering engine 440) executes the rendering process and renders the content. This includes inserting the modified textual content item in the respective container assigned for that purpose (e.g. in a recommendations widget).

FIG. 7a schematically depicts container 722 within widget 720. Note, that the rendered text includes a visible portion 723, which is the part fitted within the area of the assigned container 722 and is visible to webpage viewers, and non-visible portion 724, which is the part overflowing outside the area of the container and is not visible to webpage viewers.

At block 607 it is determined whether the text overflows outside the area designated for text in the respective container (e.g. by manipulation module 432 in content monitoring engine 430). To this end display parameters characterizing the tagged sub-elements are obtained from the browser (block 605). Various methods can be used for determining text overflow.

According to one example, display parameters including the height and width of the tagged sub-elements of a textual content item are determined. For example, to this end manipulation module 432 can query measurement module 423 and obtain the height and width of each tagged sub-element. In a similar manner, the height and width of the respective container assigned for displaying the textual content item is determined. From this data, the process of rendering of the sub-elements in the container can be emulated in memory (in particular, the emulation process itself does not affect the web page layout), to determine the precise position of each of the sub-elements relative to the area of the container. Accordingly it can be determined if one or more sub-elements are located outside the boundaries of the respective container, i.e. whether an "overflow" has occurred.

According to a second example, position of a tagged sub-element of a textual content item relative to the respective container is determined. For example, to this end manipulation module 432 can query measurement module 423 and obtain the position of one or more sub-elements relative to the respective container. In addition, the height of the respective container assigned for displaying the textual content item is determined. Based on this information, the precise position of each sub-element relative to the container can be determined, and accordingly it can be determined if one or more sub-elements are located outside the boundaries of the respective container, i.e. whether an "overflow" has occurred. For example, assuming it is determined that the top of the last sub-element (e.g. last word) is positioned 80 pixels lower in the webpage in relation to the top of the respective container, and also that the container's height is only 60 pixels, it can be deduced that at least the last word is located outside the boundaries of the respective container, i.e. an "overflow" has occurred.

Notably the examples above should not be construed as limiting and other methods for determining whether there is an overflowing sub-element can be alternatively used.

If it is determined that there is at least one sub-element overflowing outside the area designated for displaying text in the respective container, the content item is adapted so it fits within the container. Specific examples of methods for adapting the text of a textual content item to make it fit a respective container according to a predefined format are disclosed herein below.

At block 611, once the text is modified, at most a single "reflow" operation is executed by the browser (e.g. by the rendering engine 440 or by a Rendering Adjustments Engine 424) and the web page layout is displayed a second time showing the modifications.

According to one example, for the purpose of adapting the textual content item as described above (with reference to block 609), once it is determined that at least one sub-element overflows outside the boundaries of the respective container, the last line of the visible portion of the rendered text within the container is identified (e.g. by manipulation module 432 in content monitoring engine 420). Various approaches can be applied for identifying the last line.

In some cases, this information is readily available from the previous stages. For example, the last line can be identified based on the data that was used to determine whether there was an overflow as described above (with reference to block 607).

According to another example, the first sub-element (e.g. first word) in the last line (e.g. sub-element 725 in FIG. 7a) can be identified by traversing the tagged sub-elements (e.g. DOM element by DOM element) and finding the first tagged sub-element whose height offset position, relative to the container, equals (NROWS-1)*LINE_HEIGHT, where:

NROWS=number of visible rows in the container;

LINE_HEIGHT=the height of a tagged sub-element (e.g. obtained from the measurements module 423);

NROWS can be determined by dividing the container's height by LINE_HEIGHT.

For example, for LINE_HEIGHT=20 pixels and container's height of 60 pixels, NROWS=60/20=3, and the first word in the last visible line in the container is the first tagged sub-element whose height offset position, relative to the container, equals (3−1)*20=40 pixels.

One optional way of adapting the content item to fit in the respective container includes modifying the last visible line in the container to include a single DOM element, e.g. a single "div" element. This DOM element (referred to herein also as "special last line div") is configured to cause the browser to display the DOM element in a single line, truncated in case of a text overflow, possibly including a visual indication (e.g. an ellipsis " . . . ") in case such truncation has occurred.

For example, as demonstrated in FIGS. 7a and 7b, all the words from the original text following the word "several" 725, namely the words "several visual lines and even overflow its allocated container" are taken together and tagged to construct a "special last line div". The latter is inserted into the text 710 before the first tagged sub-element positioned in the last visible line, thereby "pushing" some of the tagged sub-elements to the non-visible portion (see 743 of the container 742) resulting in the adapted text 730 in FIG. 7b (where the "special last line div" is the text wrapper with <div> . . . </div> tags). This "special last line div" is styled using specific CSS styling instructions (e.g. the CSS instructions "white-space: nowrap; overflow: hidden; text-overflow: ellipsis;") that are processed by the browser (e.g. by its rendering engine 440), so it is eventually displayed as a single line, possibly truncated, and terminated with the ellipsis character " . . . " in case such truncation occurred (see for example 745 in FIG. 7*b*). In this way, the adapted text is made to fit in the respective container.

In addition, such a process may include an auxiliary first step of removing any "special last line div" occurring already in the text from previous executions of the process, and only then proceeding with the other execution steps described above. In this way, the process is "idem potent", i.e. consecutive executions of the process under the same circumstances will result in the same visual outcome as the outcome after a single execution of it. This may be useful in some situations, e.g. for ensuring general stability of the process execution, or for adapting the process to provide a responsive user experience.

Another way to adapt the content item to fit in the respective container includes selectively removing some of the tagged sub-elements from the content item in case of an overflow, and possibly adding a visual indication in case such removal has occurred. For example, manipulation module 432 can query measurements module 423 and obtain the height and width of each tagged sub-element, as well as the height and width of the respective container assigned for displaying the textual content item. From this data, in case it was determined that an "overflow" had occurred, the manipulation module 432 may select a subset of the tagged sub-elements to retain in the content item, and remove the rest of the tagged sub-elements that are not in this subset. The subset will be determined based on the display parameters obtained from the measurements module 423, while emulating in memory (in particular, the emulation process itself does not affect the web page layout) the process of rendering the tagged sub-elements in the container, thereby ensuring the adapted result eventually fits in the respective container. In addition, the emulation calculation may also be configured to leave enough space to add a visual indication (e.g. an ellipsis " . . . ") based on the displayed parameters obtained from the measurements.

For example, the text 710 may be modified by removing the tagged sub-elements corresponding to the words "would", "fit", "several", "visual", "lines", "and", "even", resulting with the modified text 750 in FIG. 7*c*, in which there is also included a visual indication (<span> . . . </span>) that an overflow has occurred, so that it is eventually displayed as demonstrated in container 762. The removed sub-elements may be persisted (e.g. stored in (browser-associated) computer memory) and remain available without being visible in the display. This allows to revert and use these sub-elements if needed in the future (for example to provide responsiveness or "idempotent" nature of the process).

An example of an approach for determining such a subset of tagged sub-elements to retain in the web page layout includes alternatingly selecting tagged sub-elements from the beginning and the end of the text, until the emulation calculation determines that there is no more space for further tagged sub-elements to be included. For example, if there are N tagged sub-elements, then the subset can include: the first (1st) tagged sub-element, the last (Nth) tagged sub-element, the second (2nd) tagged sub-element, the second-to-last ((N−1)th) tagged sub-element, and so on including sub-elements in an alternating way from the beginning to the end of the text, until the emulation calculation (without affecting the web page layout during the emulation process, e.g. as it is done in memory) determines that there is no more space for further tagged sub-elements to be included.

Another possible alternative to the approach above, in order to maximize the number of words in the subset in the method described above, is adapted to give higher priority to shorter words over longer words to be included in the subset instead of ensuring that the same number of words from the beginning to the end of the text are chosen.

Another approach for determining that a subset of sub-elements fit in a respective container aims to include, in case an overflow has occurred, a visual indication (such as ellipsis " . . . ") in a predetermined position relative to the container e.g. a specific row number of the container, for instance, always in the second-to-last row in the container. This can be achieved in a similar manner to that described above, by emulating the positioning of individual sub-elements within the container, adding the visual indication in the desired location, and continuing to place sub-elements in the remaining space (e.g. always including a word from the beginning of the text, and a word from the end of the text), until the emulation calculation determines that there is no more space for further tagged sub-elements to be included.

As mentioned above, changes made to the content of a webpage, such as adding a "special last line div", or otherwise adapting the content item to fit in the respective container, are likely to invoke at most a single "reflow" computation by the browser, ultimately resulting in the web page layout displayed a second time where the textual content fits into the container in a desirable and visually appealing manner.

Notably, based on measurements of tagged sub-elements obtained from the browser, the presently disclosed subject matter allows adapting the content items in a controlled manner, before any reflow operation is executed. Accordingly at most a single "reflow" computation (or none, in case no "overflow" occurred on the web page layout) is invoked, regardless of the number of overflowing sub-elements. In particular, this provides a scalable solution, as the approaches disclosed herein will require at most a single "reflow" computation (e.g. step 611), regardless of the length of the content items or the number of overflowing sub-elements.

According to examples of the presently disclosed subject matter, the steps 605 and 607 are done together as a single processing stage (620) for all containers in all widgets in the web page, e.g. together for all the instances of "multiline clamping problem" that need to be handled.

Only upon completion of processing stage 620 on all containers in all widgets in the web page, the next processing stage 630 is executed, in which step 609 is applied on all containers for which an overflow was determined in its respective step 607.

In case there was an overflow in one or more of the containers, step 609 is performed across all those overflowing containers. As described above, this will lead to a one time change in the web page layout, adapting all content items in the overflowing containers so they eventually fit their respective containers. Once all changes to the containers in the web page are made, a single reflow operation 611 is executed. In case there was no overflow in any of the containers in the web page, step 609 may be skipped, and the reflow at 611 will not be invoked as there was no change to the web page layout.

This ensures that the reflow 611 is invoked only at most once per page, regardless of the number of sub-elements overflowing in each container, and regardless of the number of containers which include one or more overflowing sub-elements in the page. Notably the number of containers in a single page that include overflowing sub-elements can in some cases be large, thus potentially causing a significant performance setback if dealt with separately. The presently disclosed approach is therefore scalable, allowing to handle an increasing number of instances of the "multiline clamping problem" without essentially affecting the performance.

According to some examples of the presently disclosed subject matter, the operations described above with reference to FIG. 6 can be repeated when desired. For example, in response to changes in the size or dimensions of a display (e.g. switching from horizontal view to a vertical view), a window (e.g. resizing or maximizing a window) or a container (e.g. in case other elements in the web page changed their size or dimensions), it may be desired to adapt the web page layout in order to maintain its appealing and aesthetic appearance in the new circumstances, providing a responsive user experience. For example, when a window size is changed, the area of a container assigned to display specific textual content item may change as well. Thus, it may be required to repeat the rendering process disclosed hereinabove in order to fit the text within the newly sized container according to the predefined requirements.

To this end, responsive monitoring module 434 is configured to receive an indication from the browser of changes in size or dimensions of a display, window or container as mentioned above and invoke the execution of the content rendering process in response to such an indication.

Alternatively or additionally, responsive monitoring module 434 can be configured to independently determine when changes in size or dimensions of a display, window or container occur, and invoke the execution of the content rendering process if such changes are indeed determined. For example, responsive monitoring module 434 can be configured to periodically query measurements module 423 to obtain the sizes of containers, store the obtained measurements (e.g. in computer memory 412), and compare the currently obtained measurements with previously stored measurements, and determine, based on the comparison, whether changes in the size of containers has occurred.

What is claimed is:

1. A computer program product comprising a non-transitory computer readable storage medium retaining program instructions, which program instructions, when read by a processor, cause the processor to perform:
   obtaining a formatted document, wherein the formatted document comprises a container, wherein the container defining an area within the formatted document designed for displaying a content item, wherein the content item comprises a plurality of tagged sub-elements;
   rendering, at a browser, at least a portion of the tagged sub-elements in the container;
   based on said rendering, obtaining from the browser, display para meters of the portion of tagged sub-elements to identify a subset of tagged sub-elements from the portion of tagged elements that overflow the area defined by the container; and
   in response to identifying the overflow, and based on the display parameters, adding a new sub-element to the content item to obtain an adapted content item, wherein the new sub-element comprises at least a first element and a second element, wherein the first element corresponds to at least one tagged sub-element from the subset of tagged sub-elements and the second element corresponds to at least one tagged sub-element from the portion of tagged sub-elements, wherein the adapted content item is adapted to be displayed within the area of the container.

2. The computer program product of claim 1, wherein the area is a multi line area, wherein the new sub-element comprises at least a portion of a last visible line of the content item as defined by the tagged sub-elements, wherein the new sub-element is defined with an instruction to a rendering engine of the browser to automatically truncate an overflow of a single line.

3. The computer program product of claim 2, wherein the adapted content item comprises two copies of the at least the portion of the last visible line, wherein a first copy is defined using the new sub-element and is visible in a rendered version of the adapted content item within the area of the container, and wherein the second copy is not visible in the rendered version of the adapted content item within the area of the container.

4. The computer program product of claim 1, wherein the program instructions, when read by the processor, further cause the processor to perform: removing at least one tagged sub-element of the plurality of tagged sub-elements.

5. The computer program product of claim 1, wherein said adding the new sub-element comprises determining a location to place the new sub-element based on the display parameters.

6. The computer program product of claim 1, wherein said obtaining the formatted document comprises receiving from a server the formatted document, wherein the server preprocessed an original version of the formatted document to tag sub-elements of the content item.

7. The computer program product of claim 1, wherein said obtaining the formatted document comprises:
   obtaining an original version of the formatted document;
   identifying sub-elements of the content item in the original version; and
   tagging the sub-elements of the content item, thereby creating the tagged sub-elements.

8. The computer program product of claim 7, wherein said tagging the sub-elements comprises: wrapping each sub-element with an HTML tag to thereby transform the sub-element into a Document Object Model (DOM) element.

9. The computer program product of claim 1, wherein the content item includes textual content and the tagged sub-elements include tagged textual sub-elements.

10. The computer program product of claim 1, wherein said identifying the overflow comprises:
    determining, based on the display parameters, a position of at least one tagged sub-element with respect to the area of the respective container; and
    determining that the position is indicative of the at least one tagged sub-element being located outside boundaries of the area.

11. The computer program product of claim 1, wherein in response to said adding, the browser is configured to render the adapted content item in the area of the container exactly once, whereby dynamically adapting the content item on a user device based on the area of the container using at most a single reflow computation by the browser to fit within the area of the container.

12. The computer program product of claim 1, wherein said rendering, said obtaining the display parameters, said identifying and said adding are performed with respect to a plurality of content items, wherein in response to said adding, the browser is configured to cause at most a single reflow computation, irrespective of a number of content items that are adapted due to a plurality of identified overflows, to fit within the areas of the respective containers.

13. The computer program product of claim 1, wherein the program instructions, when read by the processor, further cause the processor to perform:
   in response to a change in one or more display environment characteristics, automatically repeating said obtaining the display parameters, said identifying and said adding to thereby adapt the content item to fit within the area of the container.

14. The computer program product of claim 13, wherein the program instructions, when read by the processor, further cause the processor to perform:
   monitoring display environment characteristics, including at least one of:
      a size of a window assigned for displaying the formatted document;
      dimensions of the window assigned for displaying the formatted document;
      a size of the area of the container; and
      dimensions of the area of the container.

15. A method comprising:
   obtaining a formatted document, wherein the formatted document comprises a container, wherein the container defining an area within the formatted document designed for displaying a content item, wherein the content item comprises a plurality of tagged sub-elements;
   rendering, at a browser, at least a portion of the tagged sub-elements in the container;
   based on said rendering, obtaining from the browser, display parameters of the portion of tagged sub-elements to identify a subset of tagged sub-elements from the portion of tagged elements that overflow the area defined by the container; and
   in response to identifying the overflow, and based on the display parameters, adding a new sub-element to the content item to obtain an adapted content item, wherein the new sub-element comprises at least a first element and a second element, wherein the first element corresponds to at least one tagged sub-element from the subset of tagged sub-elements and the second element corresponds to at least one tagged sub-element from the portion of tagged sub-elements, wherein the adapted content item is adapted to be displayed within the area of the container.

16. The method of claim 15, wherein the area is a multi line area, wherein the new sub-element comprises at least a portion of a last visible line of the content item as defined by the tagged sub-elements, wherein the new sub-element is defined with an instruction to a rendering engine of the browser to automatically truncate an overflow of a single line.

17. The method of claim 15, wherein said adding the new sub-element comprises determining a location to place the new sub-element based on the display parameters.

18. An apparatus comprising a processor and a coupled memory, wherein said processor is configured to perform:
   obtaining a formatted document, wherein the formatted document comprises a container, wherein the container defining an area within the formatted document designed for displaying a content item, wherein the content item comprises a plurality of tagged sub-elements;
   rendering, at a browser, at least a portion of the tagged sub-elements in the container;
   based on said rendering, obtaining from the browser, display parameters of the portion of tagged sub-elements to identify a subset of tagged sub-elements from the portion of tagged elements that overflow the area defined by the container; and
   in response to identifying the overflow, and based on the display parameters, adding a new sub-element to the content item to obtain an adapted content item, wherein the new sub-element comprises at least a first element and a second element, wherein the first element corresponds to at least one tagged sub-element from the subset of tagged sub-elements and the second element corresponds to at least one tagged sub-element from the portion of tagged sub-elements, wherein the adapted content item is adapted to be displayed within the area of the container.

19. The apparatus of claim 18, wherein the area is a multi line area, wherein the new sub-element comprises at least a portion of a last visible line of the content item as defined by the tagged sub-elements, wherein the new sub-element is defined with an instruction to a rendering engine of the browser to automatically truncate an overflow of a single line.

20. The apparatus of claim 18, wherein said adding the new sub-element comprises determining a location to place the new sub-element based on the display parameters.

* * * * *